(12) United States Patent
Chiba et al.

(10) Patent No.: US 8,102,919 B2
(45) Date of Patent: Jan. 24, 2012

(54) IMAGE CODING APPARATUS AND IMAGE DECODING APPARATUS

(75) Inventors: Takuma Chiba, Osaka (JP); Takeshi Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 1028 days.

(21) Appl. No.: 12/024,726

(22) Filed: Feb. 1, 2008

(65) Prior Publication Data

US 2008/0187051 A1 Aug. 7, 2008

(30) Foreign Application Priority Data

Feb. 1, 2007 (JP) ................................ 2007-023232

(51) Int. Cl.
*H04N 7/12* (2006.01)
(52) U.S. Cl. .............................. 375/240.23; 375/240.04
(58) Field of Classification Search ........................ None
See application file for complete search history.

(56) References Cited

U.S. PATENT DOCUMENTS

| 5,396,428 | A * | 3/1995 | Tichborne et al. ............. 701/13 |
| 5,440,344 | A * | 8/1995 | Asamura et al. ......... 375/240.04 |
| 7,274,862 | B2 * | 9/2007 | Komori ......................... 386/207 |
| 2005/0249289 | A1 | 11/2005 | Yagasaki et al. | |
| 2006/0280371 | A1 | 12/2006 | Shimazaki et al. | |
| 2007/0040708 | A1 | 2/2007 | Senda | |
| 2007/0274393 | A1 | 11/2007 | Toma et al. | |
| 2008/0187051 | A1 * | 8/2008 | Chiba et al. .............. 375/240.23 |
| 2010/0027971 | A1 | 2/2010 | Toma et al. | |
| 2010/0290523 | A1 | 11/2010 | Toma et al. | |
| 2010/0290758 | A1 | 11/2010 | Toma et al. | |
| 2010/0329330 | A1 | 12/2010 | Yagasaki et al. | |
| 2010/0329331 | A1 | 12/2010 | Yagasaki et al. | |
| 2010/0329351 | A1 | 12/2010 | Yagasaki et al. | |
| 2011/0007818 | A1 | 1/2011 | Yagasaki et al. | |
| 2011/0044387 | A1 | 2/2011 | Yagasaki et al. | |

FOREIGN PATENT DOCUMENTS

| JP | 2003-259370 | 9/2003 |
| JP | 2004-135251 | 4/2004 |
| JP | 2005-348207 | 12/2005 |
| JP | 2005-354542 | 12/2005 |
| JP | 2006-67485 | 3/2006 |
| JP | 2007-20141 | 1/2007 |
| WO | 2005/041420 | 5/2005 |
| WO | 2006/025388 | 3/2006 |

OTHER PUBLICATIONS

Impress standard textbook series, Revision of H.264/AVC Textbook, First Edition issued on Jan. 1, 2006, pp. 210-215, Impress R&D, An Impress Group Company.

(Continued)

*Primary Examiner* — Robert Wilson
(74) *Attorney, Agent, or Firm* — Wenderoth, Lind & Ponack, L.L.P.

(57) ABSTRACT

An image coding apparatus which reduces buffer capacity to a minimum and includes an image coding processing unit which generates intermediate data by executing a part of a process in the coding on the image data; a packetizing unit which generates an image stream by executing a process other than the part of the process in the coding on the intermediate data, such as for example arithmetic coding, and packetizes the generated image stream in synchronization with the image stream generation process.

3 Claims, 11 Drawing Sheets

OTHER PUBLICATIONS

Thinh M Le, X.H. Tian, B.L.Ho, J. Nankoo, Y. Lian, "*System-on-Chip Design Methodology for a Statistical Coder*", Proceedings of the Seventeenth IEEE International Workshop on Rapid System Prototyping (RSP'06), Jun. 2006.

S. Kakuno et al., Impress Standard Textbook Series, Revision of H.264/AVC Textbook, First Edition, Jan. 1, 2006, Impress R & D, an Impress Group Company. (Partial English language translation of p. 210, Line 1 to p. 214, Line 9 provided).

* cited by examiner

IMAGE CODING APPARATUS AND IMAGE DECODING APPARATUS

BACKGROUND OF THE INVENTION (1) Field of the Invention

The present invention relates to an image coding apparatus for coding data related to a moving image and an image decoding apparatus for decoding the coded data, and particularly to an image coding apparatus and an image decoding apparatus which corresponds to the H.264/AVC standard.

(2) Description of the Related Art

Along with the development of digital technology, technology for coding images has also progressed and developed. However, since the amount of data in video information, especially moving picture information, is extremely great, the data transfer amount becomes extremely large when a coded digital video is transferred by media such as broadcast or Digital Versatile Disk (DVD). In particular, the amount of data in recently implemented hi-resolution broadcasts is six times the amount of data in a conventional Standard Definition (SD) video.

Along with development in digital video technology, technology for compressing data in order to process increasing amount of data has been used and developed for digital video data, however this development is made possible by compression technology which utilizes video data properties. Along with the increase in information process ability for computers, complex calculations can be performed for compression technology and video data compression rates have significantly increased. For example, the compression technology utilized in digital high definition satellite broadcasting or terrestrial high definition broadcasting is a codec known as MPEG-2, which compresses digital high definition satellite broadcasts to approximately $\frac{1}{30}^{th}$ of their size.

AVC/H.264 (H.264/AVC) which is standardized to be the next video compression technology in MPEG-2 is a standard which realizes a compression rate approximately twice that of MPEG-2. A multitude of compression technologies are included in AVC/H.264, and a high compression rate is realized by combining these technologies. As a result, the calculation amount significantly rises. Video data compressed according to MPEG-2 and AVC/H.264 is multiplexed according to a standard known as the MPEG-2 system, and transmitted. In the MPEG-2 system, two format types are defined: the transport stream (TS) and the program stream (PS).

Encoded image data and audio data is known as a bit stream, and a packetized bit stream is known as a Packetized Elementary Stream (PES). PES is multiplexed by either a transport stream or a program stream.

A transport stream can include more than one program inside the stream at the same time, and has a format designed for used in an environment in which transmission errors in digital broadcasting and so on may occur. In other words the transport stream is a stream in which the program information and PES are multiplexed and aligned into TS packets at fixed lengths of 188 bytes.

The program stream is a format designed for use in environments where errors will likely not occur such as recording media like a DVD, and is made up of one program. A header attached at the top of aligned plural PES is called a pack and plural aligned packs compose a program stream.

Here, a buffer model is defined in order to not overflow the decoder buffer when the image is decoded. Coded Picture Buffer (CPB) and Decoded Picture Buffer (DPB) are defined as buffer models in AVC/H.264. CPB is a buffer which holds a stream before it is inputted into the decoder, and the DPB is a buffer which holds a picture that has been decoded by the decoder. When decoding a picture, the data in the picture stored in the CPB is extracted and instantly decoded by the decoder and movement such as that stored in the DFB is anticipated.

There are two methods: Constant Bit Rate (CBR), in which the rate of the inputted data is fixed, and Variable Bit Rate (VBR) in which the rate of the inputted data varies. In either case, when the picture data inputted into the decoder is instantly extracted, the picture data is controlled during coding such that a CPB underflow is not generated. For CBR, the data inputted into the CPB is controlled so as not to overflow. For VBR, when the CPB is full, the data input can be temporarily paused and thus an overflow in the CPB is not of concern. The greatest value in the input rate for the CPB differs according to the coding conditions, however for example the value defined in the Read-Only Format of a Blue-Ray Disk is 40,000,000 bps for level 4.1.

On the other hand, entropy coding (variable-length coding) is a compression technology included in AVC/H.264. The two schemes CAVLC and CABAC are present as entropy coding schemes. When coding a DCT coefficient in Context-based Adaptive Variable-length Coding (CAVLC), coding is performed from the opposite direction of the scan direction using the column and level which is the length of repeating 0's in the variable-length coding table.

CABAC is an abbreviation for Context-based Adaptive Binary Arithmetic Coding, is a scheme for changing the appearance rate of a coding target which changes with time and is a widely known scheme for arithmetic coding. In CABAC, in addition to normal arithmetic coding, a context is attached to each section of code which must be compressed, and the appearance rate is modified for each context.

Coding in CABAC is divided mainly into two processes. The first is a process known as binarization which changes multi-value information which must be coded, known as Syntax, into binary data, the second is a process for performing arithmetic coding which calculates the context for the binarization data changed by binarization.

The arithmetic coding finds an appearance rate of 0/1 for each bit of binary data, performs a coding process and updates the appearance rate at the same time. As a result, the arithmetic coding is a process performed per bit and the calculation speed is normally 1 bit/1 clock.

Additionally, one picture which makes up the moving image is created from a value which shows the strength and coloration of the light which is known as a pixel, and composes a basis in which 16×16 pixels known as a macroblock are collected. Normal moving picture compression is performed on a one macroblock basis. In a high-definition image, one picture is formed of 1920×1088 pixels and 120×68 macroblocks.

Since most of the image compression processing is performed using repetition per macroblock, the image compression is performed by strongly considering the macroblock basis, and when the pipeline processing and so on is performed, the image compression processing generally functions as a pipeline per macroblock. In other words, the time for processing one macroblock is approximately fixed for any macroblock.

The code amount when one macroblock is compressed is determined according to the state of the pixel included in the macroblock, and normally the code amount of a macroblock with a uniform pixel value decreases, and when the pixel value notably varies in one macroblock, the code amount increases. This shows that in a screen, there are areas where coding is often generated and where coding is not generated.

The arithmetic coding process is the calculation speed for 1 bit/1 clock as described above. When the code amount of one macroblock is extremely large, sometimes the arithmetic coding process for one macroblock cannot be finished within the processing time for 1 macroblock. Further, when this kind of situation has continued, the data for which the arithmetic coding process cannot be performed is recorded as queued data. In order to avoid this situation, the arithmetic coding process is designed to function at high-speed.

However, since there are limits to the speed at which arithmetic coding is performed, there are methods proposed to solve this problem (see for example Patent Document 1, Japanese Laid-Open Patent Publication 2003-259370). In the image coding apparatus or the image coding method in Patent Document 1, the intermediate code (intermediate data) uniformly corresponding to the variable-length coding is temporarily stored in the buffer in the process for coding the inputted image signal, and the variable-length coding and processing other than the variable-length coding is performed without synchronization by performing variable-length code on the intermediate code.

However in the image coding apparatus realized based on the Patent Document 1, there is the problem that the capacity of the buffer in the entire image coding apparatus increases remarkably.

FIG. 1 is a block diagram which shows the structure of the image coding apparatus realized based on the above Patent Document 1.

The image coding apparatus includes an image coding processing unit 901, an intermediate buffer 902, a variable-length coding unit 903, a CPB 904 and a packet generating unit 905.

The image coding processing unit 901 generates intermediate data (intermediate code) by coding the image data, and stores the intermediate data in the intermediate buffer 902.

The variable-length coding unit 903 reads out the intermediate data stored in the intermediate buffer 902 and generates an image stream which is a bit stream by performing variable-length code on the intermediate data. Subsequently, the variable-length coding unit 903 stores the image stream in the CPB 904.

The packet generating unit 905 reads out the image stream stored in the CPB 904, generates and outputs PES by packetizing the image stream.

In other words, in the image coding apparatus based on the Patent Document 1, the buffer capacity increases remarkably since two buffers, the intermediate buffer 902 and the CPB 904, are necessary. As a result, there are problems such as the increased scale of the image coding apparatus, the increase in input/output bandwidth for the buffer and the increase in the processing amount for controlling the amount of data stored in the buffer.

Additionally, in order to correspond to the structure of the above image coding apparatus, the image decoding apparatus realized based on the Patent Document 1 includes a CPB for storing the image stream before decoding, a variable-length decoding unit which performs variable-length coding on the image stream and generates the intermediate data, an intermediate buffer for storing the intermediate data, and an image decoding processing unit which uses the intermediate data as input and performs decoding other than variable-length decoding.

Accordingly, in the image decoding apparatus realized based on the above Patent Document 1, there is the problem that the capacity of the buffer in the buffer increases remarkably in the same way as the image coding apparatus described above.

Thus, the present invention is realized in view of the above problems, with the object of providing an image coding apparatus and an image decoding apparatus in which the capacities of the buffers have been reduced.

SUMMARY OF THE INVENTION

In order to accomplish the objects above, an image coding apparatus according to the present invention is an image coding apparatus which codes image data representing a moving image, the image coding apparatus including: a first coding unit configured to generate first data by executing, on the image data, processing before a binarization process is performed during the coding of the image data; a buffer unit configured to temporarily store the generated first data; a second coding unit configured to generate second data by reading out the first data stored in the buffer unit and executing an arithmetic coding process on the read-out first data; and a packetizing unit configured to, subsequent to the arithmetic coding process, packetize and output the second data without temporarily recording the generated second data. Additionally, the second coding unit is configured to change an amount of the second data to be output to the packetizing unit by changing an amount of the first data to be read out from the buffer unit and an amount of processing on the read-out first data so that a difference between a preset target value and an amount of data which the packetizing unit actually outputs is reduced. In other words, movement prediction, DCT, the binarization of the variable-length coding and so on are performed by the first coding unit and arithmetic coding, which is part of the variable-length coding, is performed by the second coding unit.

As a result of the packetizing unit being capable of packetizing and outputting the second data without temporarily recording the second data generated by the second coding unit, a buffer for storing the second data can be obviated and the buffer capacity for the whole image coding apparatus can be reduced to a minimum. Further since there is no need to include a buffer for storing the second data (CPB), the amount of processing in the control processor for buffer control can be reduced and since the amount of LSI for the calculation process can be reduced, the data transfer rate for input and output into/from the buffer can also be reduced. As a result, the hardware load is reduced and the LSI cost can be reduced. Additionally, since calculation processing for the buffer control can be reduced, program writing costs for the calculations can also be reduced.

Additionally, the second coding unit may be configured to increase the amount of the first data to be read out from the buffer unit and increase the amount of processing on the read-out first data, when the amount of data which the packetizing unit outputs is smaller than the preset target value. Further, an amount of data which the second coding unit reads out from the buffer unit per unit time and an amount of data which the packetizing unit outputs per unit time are substantially the same.

Note that the present invention cannot only be realized as such an image coding apparatus, but can be realized as a method or a program, recording media on which the program is stored and an integrated circuit.

The image coding device of the present invention has the effect that the buffer capacity can be reduced to a minimum.

FURTHER INFORMATION ABOUT TECHNICAL BACKGROUND TO THIS APPLICATION

The disclosure of Japanese Patent Application No. 2007-023232 filed on Feb. 1, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Below, the embodiments of the present invention are explained with reference to the diagrams.

First Embodiment

Figure 2:
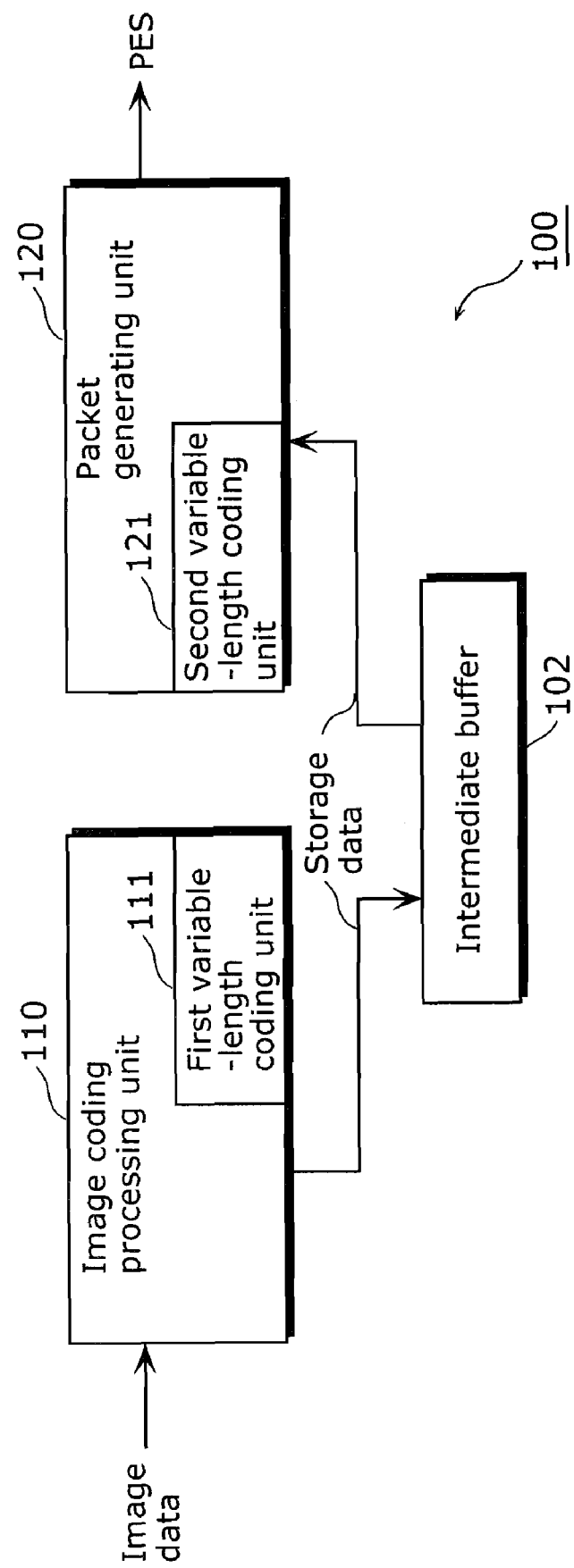
FIG. 2 is a functional block diagram which shows the functional structure of the image coding apparatus according to the first embodiment of the present invention.

FIG. 2 is a functional block diagram which shows the functional structure of the image coding apparatus according to the first embodiment of the present invention.

The image coding apparatus 100 in the present embodiment is an apparatus for reducing the buffer capacity and includes an image coding processing unit 110, an intermediate buffer 102 and a packet generating unit 120. Additionally, the image coding apparatus 100 for example performs coding according to the H.264/AVC standard and switches the variable-length coding scheme between CABAC and CAVLC.

Note that in the present embodiment, the image coding processing unit 110 is composed as a first coding unit, the second variable-length coding unit 121 is composed as a second coding unit, and the packet generating unit 120 is composed as a packetizing unit.

The image coding processing unit 110 obtains the image data which shows a moving image. Subsequently, the image coding processing unit 110 executes image coding pre-processing which includes movement prediction, intra-prediction, Discrete Cosine Transform (DCT), and quantization in image coding, and executes variable-length coding (all variable-length coding or part of a process). The image coding processing unit 110 generates storage data (intermediate data or an image stream) and stores the storage data in the intermediate buffer 102 according to the execution result. Note that the image coding for the image data is performed by performing the variable-length coding after the image coding pre-processing above is performed.

Additionally, the image coding processing unit 110 includes a first variable-length coding unit 111. When the first variable-length coding unit 111 is instructed to perform variable-length coding according to CAVLC, variable-length coding is executed based on CAVLC for the data generated by the image coding pre-processing above. As a result, the first variable-length coding unit 111 generates the image stream which is a bit stream (third data) as the storage data above and stores the image stream in the intermediate buffer 102.

Further, when the first variable-length coding unit 111 is instructed to perform variable-length coding according to CABAC, only binarization for the variable-length coding based on CABAC for the data generated by the image coding pre-processing above is performed. As a result, the first variable-length coding unit 111 generates intermediate data (first data) as the storage data described above and stores the intermediate data in the intermediate buffer 102.

The image coding processing unit 110 executes the image coding pre-processing and variable-length coding described above on the macroblock basis which composes the image, synchronizes with the macroblock process and performs an image coding process. Accordingly, since the storage data outputted from the macroblock is determined according to the image composed by the macroblocks, the data rate of the storage data outputted from the image coding processing unit 110 is not fixed.

The intermediate buffer 102 temporarily holds the storage data generated by the image coding processing unit 110.

The packet generating unit 120 reads out the storage data stored in the intermediate buffer 102 and generates the PES based on the stored data.

Here, the packet generating unit 120 in the present embodiment includes a second variable-length coding unit 121. When the second variable-length coding unit 121 is instructed to perform variable-length coding according to CAVLC, the stored data stored in the intermediate buffer 102 is read out as an image stream, processing is not performed on the image stream and the image stream is packetized. As a result, the packet generating unit 120 generates and outputs the Packetized Elementary Stream (PES) by dividing and packetizing the image stream into a particular size.

On the other hand, when the second variable-length coding unit 121 is instructed to perform variable-length coding according to CABAC, the stored data stored in the intermediate buffer 102 is read out as intermediate data, and by performing processing that was not performed on the intermediate data by the first variable-length coding unit 111 among the CABAC variable-length coding, the image stream (the second data) is generated and outputted. For example, for the CABAC process in AVC/H.264, the first variable-length coding unit 111 performs the binary processing included in the variable-length coding process, and the second variable-length coding unit 121 performs the arithmetic coding process included in the variable-length coding process. As a result, the packet generating unit 120 generates and outputs the Packetized Elementary Stream (PES) by dividing and packetizing the image stream generated by the second variable-length coding unit 121 into a particular size.

Figure 3:
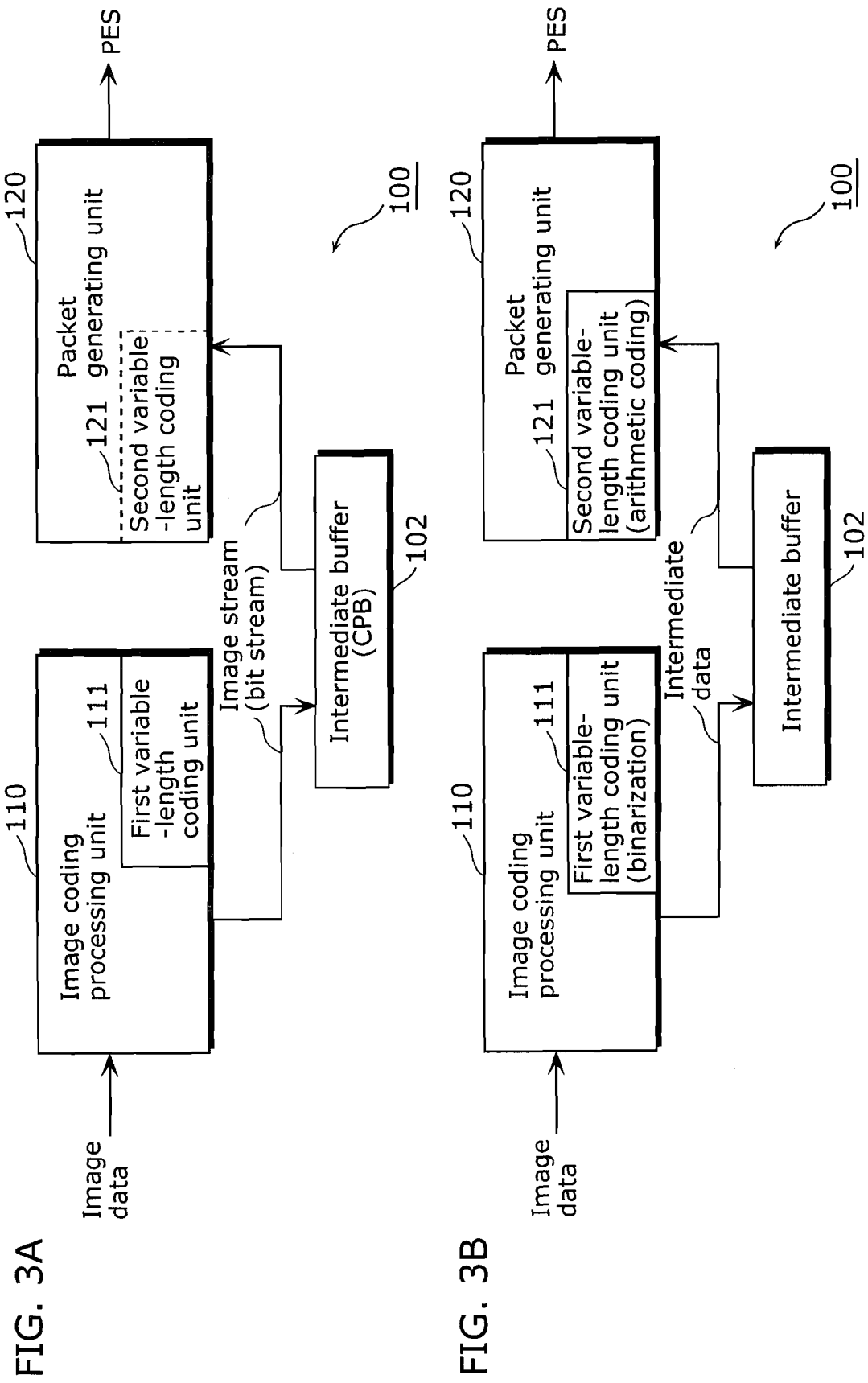
FIG. 3A is an illustrative diagram for explaining the processing functions for CAVLC and CABAC in the image coding apparatus above.
FIG. 3B is an illustrative diagram for explaining the processing functions for CAVLC and CABAC in the image coding apparatus above.

FIG. 3A and FIG. 3B are illustrative diagrams for explaining the processing functions of CAVLC and CABAC in the image coding apparatus 100.

As shown in FIG. 3A, when the image coding processing unit 110 is instructed to perform variable-length coding according to CAVLC, image coding is performed for the image data from the image coding pre-processing to the variable-length coding. As a result, the image coding processing unit 110 generates an image stream and stores the image stream in the intermediate buffer 102. Subsequently, the packet generating unit 120 generates and outputs the PES by reading out and packetizing the image stream stored in the intermediate buffer 102. In other words, in this case, the intermediate buffer 102 is used as the CPB and no actual processes are performed by the second variable-length coding unit 121.

On the other hand as shown in FIG. 3B, when the image coding processing unit 110 is instructed to perform variable-length coding according to CABAC, processing from the image coding pre-processing to the binarization of the variable-length coding, in other words partial image coding, is performed for the image data. As a result, the image coding processing unit 110 generates the intermediate data and stores the intermediate data in the intermediate buffer 102. Subsequently, the packet generating unit 120 generates an image stream by reading out the intermediate data stored in the intermediate buffer 102 by performing arithmetic coding on the intermediate data in the second variable-length coding unit 121. Further, the packet generating unit 120 generates and outputs the PES by packetizing the image stream.

In the image coding apparatus 100, the packet generating unit 120 outputs the PES by processing the storage data according to the output data rate determined by the user or the output data rate determined by the system which includes the image coding apparatus 100. The ratio of the data rate at which the storage data is read out by the packet generating unit 120 and the data rate at which the PES is outputted is always the same and thus not described.

Subsequently, the packet generating unit 120 in the present embodiment synchronizes arithmetic coding processing and the packetizing processing performed by the second variable-length coding unit 121.

Additionally, the packet generating unit 120 reads out the storage data from the intermediate buffer 102 with the PES amount, which corresponds to the output data rate determined above, as a target. Further, when CABAC is designated, the second variable-length coding unit 121 performs the variable-length coding process (arithmetic coding) and generates the image stream with the PES amount as a target, and the packet generating unit 120 packetizes the image stream and outputs the PES. On the other hand, when CAVLC is designated, the packet generating unit 120 packetizes the image stream which is stored data, with the PES amount as a target, and outputs the PES.

Accordingly, when the output amount of the PES is larger than the target amount, the packet generating unit 120 reduces the input amount of storage data and when the PES output amount is lower than the target amount, the inputted storage amount of data and the processing amount for the packetizing process are increased. Accordingly, when the output amount of the PES is less than the target amount for the packet generating unit 120 and when CABAC is designated, the variable-length coding process is synchronized with the packetizing process and the processing amount for the variable-length coding process is also increased.

The data rate of the storage data read out by the packet generating unit 120 is approximately fixed compared to a data rate for the storage data outputted by the image coding processing unit 110, which dramatically changes. Since the difference between the data rate of the storage data is included, the storage data is stored temporarily in the intermediate buffer 102.

Additionally, as described above, the CABAC variable-length coding process determined in the standard is divided between a process performed by the first variable-length coding unit 111 in the image coding processing unit 110 and the second variable-length coding unit 121 in the packet generating unit 120. Within the CABAC variable-length coding process, a process optimized for functioning on a macroblock basis is performed by the first variable-length coding unit 111 and a process optimized for being executed at a fixed processing rate is performed by the second variable-length coding unit 121. For example, in the CABAC process in AVC/H.264, the first variable-length coding unit 111 performs the binary processing since the binary processing depends on the content of the macroblocks, and the second variable-length coding unit 121 performs the arithmetic coding process since the calculation coding process is performed at a fixed processing rate of 1 bit/1 to 2 clocks.

Figure 1:
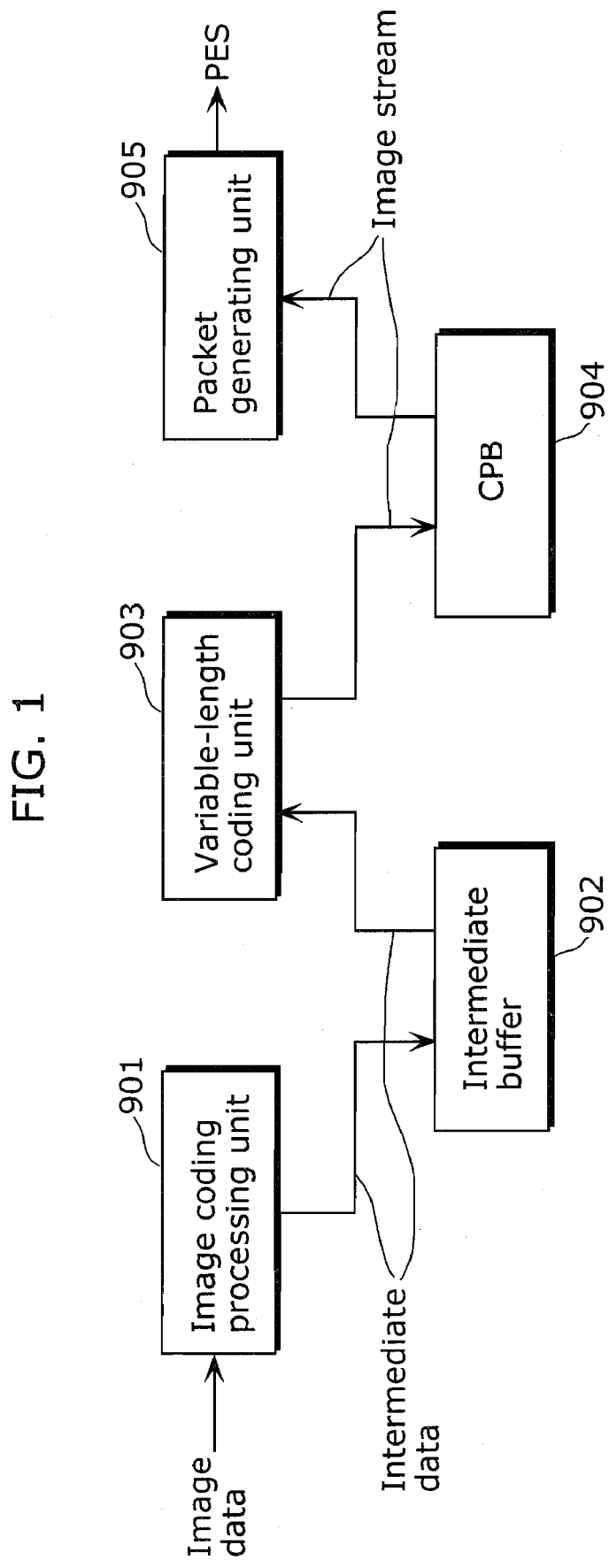
FIG. 1 is a block diagram which shows the image coding apparatus realized based on the prior art.

In this way, a buffer can be obviated in the image coding apparatus 100 of the present embodiment when variable-length coding is performed according to CABAC, since the packet generating unit 120 performs arithmetic coding and packetization in synchronization, and the image stream generated by the calculation coding is stored. In other words, a CPB (the CPB 904 shown in FIG. 1), which is conventionally necessary, can be obviated. As a result, the capacity of the buffer can be reduced in the entire image coding apparatus 100. Further, since there is no need to include the conventionally necessary CPB, the processing amount in the control processor for buffer control can be reduced, the LSI amount for the calculation process can be reduced and the data transfer rate for input and output to the buffer can also be reduced. As a result, the hardware load is reduced and the LSI cost can be reduced. Additionally, since calculation processing for the buffer control is reduced, the program creation cost required for the calculations can be reduced. Additionally, even when processing in the image coding apparatus 100 is realized using software, the buffer capacity and the processing amount can be reduced.

Figure 4:
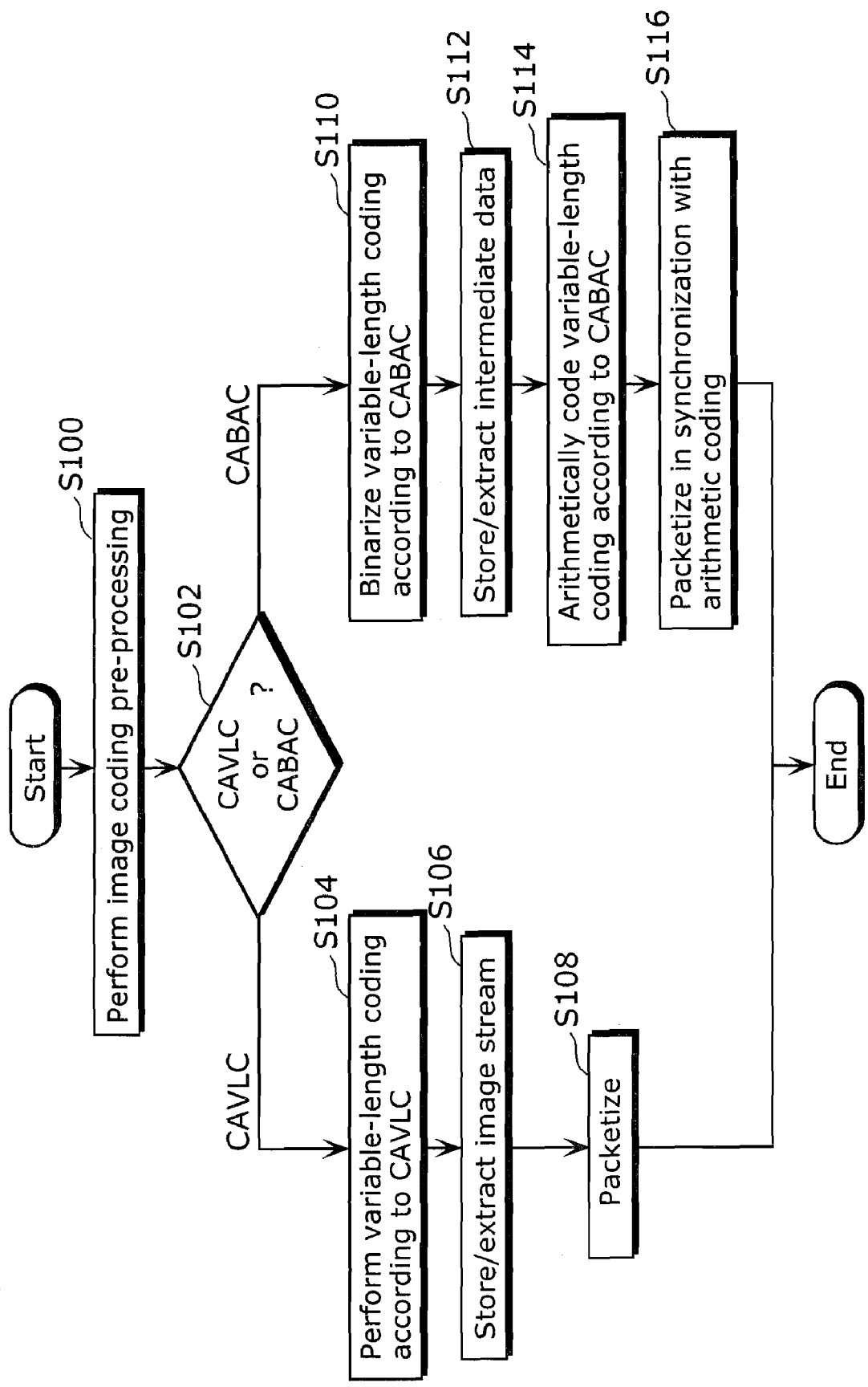
FIG. 4 is a flowchart which shows functions of the processes of the image coding apparatus above.

FIG. 4 is a flowchart which shows a function of the image coding apparatus 100 in the present embodiment.

First, when the image coding apparatus 100 obtains the image data, image coding pre-processing is executed on the image data (Step S100). Subsequently, the image coding apparatus 100 determines whether to perform variable-length coding for the image data according to CAVLC or to perform variable-length coding according to CABAC (Step S102).

Subsequently, when the image coding apparatus 100 determines that the variable-length coding according to CAVLC is to be performed, the image coding apparatus 100 executes variable-length coding according to CAVLC on the data generated by the image coding pre-processing, and generates an image stream (Step S104). Subsequently, the image coding apparatus 100 stores the generated image stream in the intermediate buffer 102 and extracts the image stream stored in the intermediate buffer 102 (Step S106). Further, the image coding apparatus 100 packetizes the obtained image stream and generates the PES (Step S108).

On the other hand, when the image coding apparatus 100 determines that the variable-length coding according to CABAC is to be performed (CABAC in Step S102), the image coding apparatus 100 executes only the binarization in variable-length coding according to CABAC on the data generated by the image coding pre-processing, and generates intermediate data (Step S110). Subsequently, the image coding apparatus 100 stores the generated intermediate data in the intermediate buffer 102 and obtains the intermediate data stored in the intermediate buffer 102 (Step S112). Further, the image coding apparatus 100 executes the arithmetic coding in the variable-length coding according to CABAC for the obtained intermediate data, and generates an image stream (Step S114). Subsequently, the image coding apparatus 100 packetizes the generated image stream and generates the PES (Step S116).

(First Modification)

Below, the first modification of the above first embodiment is described.

The image coding apparatus according to the present modification predicts the code amount of the image stream generated by the first variable-length coding unit 111 or the second variable-length unit 121 and causes the process in the image coding processing unit 110 feed back.

Figure 5:
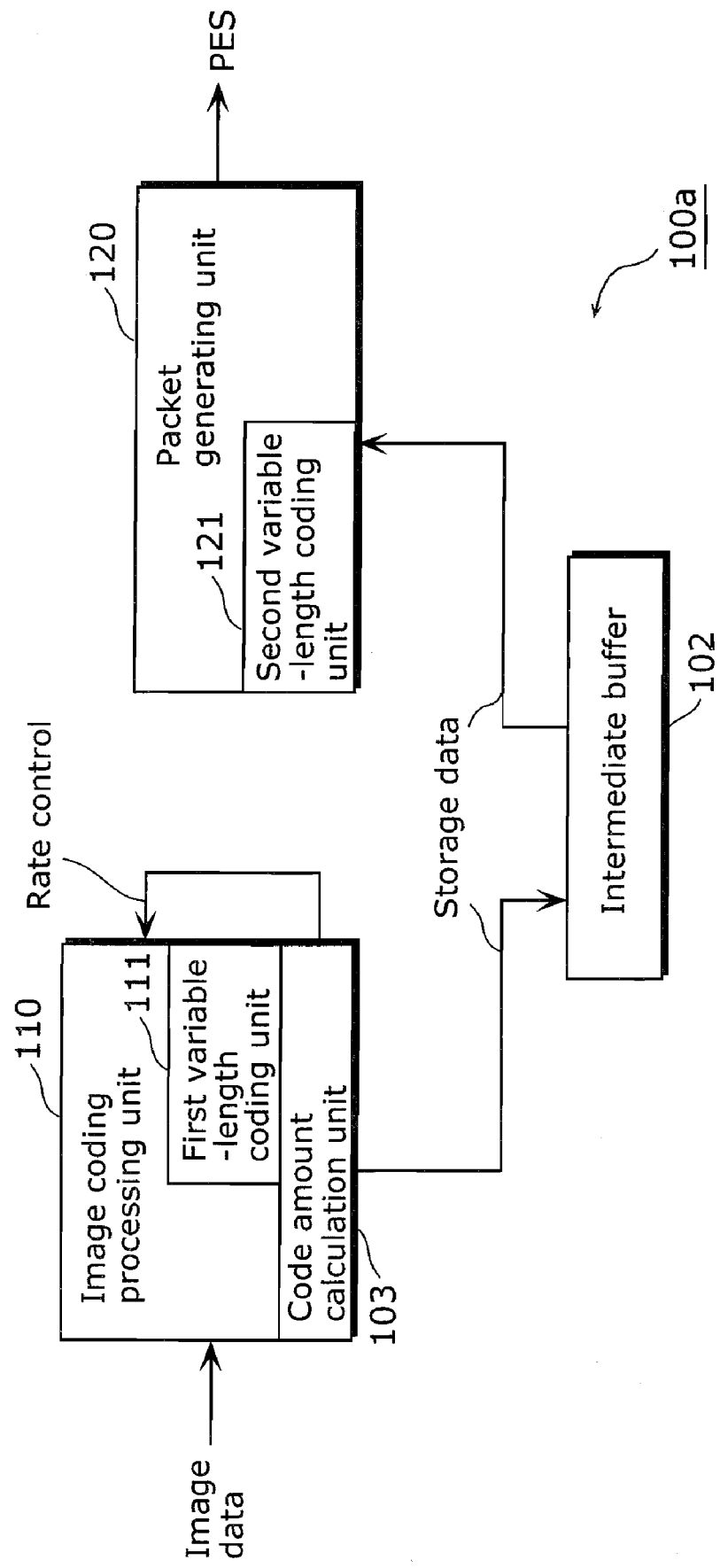
FIG. 5 is a functional block diagram which shows the functional structure of the image coding apparatus according to the same first modification.

FIG. 5 is a functional block diagram which shows the functional structure of the image coding apparatus according to the present modification.

The image coding apparatus 100a according to the present modification includes the image coding processing unit 110, the packet generating unit 120, the intermediate buffer 102 and a code amount calculation unit 103. In other words, the image coding apparatus 100a according to the present modification further includes a code amount calculation unit 103 for each element of the image coding apparatus 100 in the first embodiment above.

The code amount calculation unit 103 calculates a code amount of the image stream generated by the first variable-length coding unit 111 or the second variable-length coding unit 121 using at least one of intermediate data, an image stream, a parameter extracted from the image data, and data generated in the processing sequence of the image coding processing unit 110, which are outputted from the image coding processing unit 110. Note that the above-mentioned intermediate data is data binarized by the first variable-length coding unit 111.

The image coding processing unit 110 controls the rate based on the code amount calculated by the code amount calculation unit 103 described above. For example, the image coding processing unit 110 performs control such as controlling the output data rate to a target rate for the storage data as rate control, controlling the processing speed in the image coding processing unit 110 to match a target processing speed, controlling to prevent underflow and overflow in the intermediate buffer 102 and controlling to create a stream according to the standard.

Thus, underflow and overflow can be prevented in the intermediate buffer 102, and appropriate image coding can be performed.

(Second Modification)

Here, the modifications in the first embodiment and the second embodiment above are described.

The image coding apparatus according to the present embodiment codes an image and audio.

Figure 6:
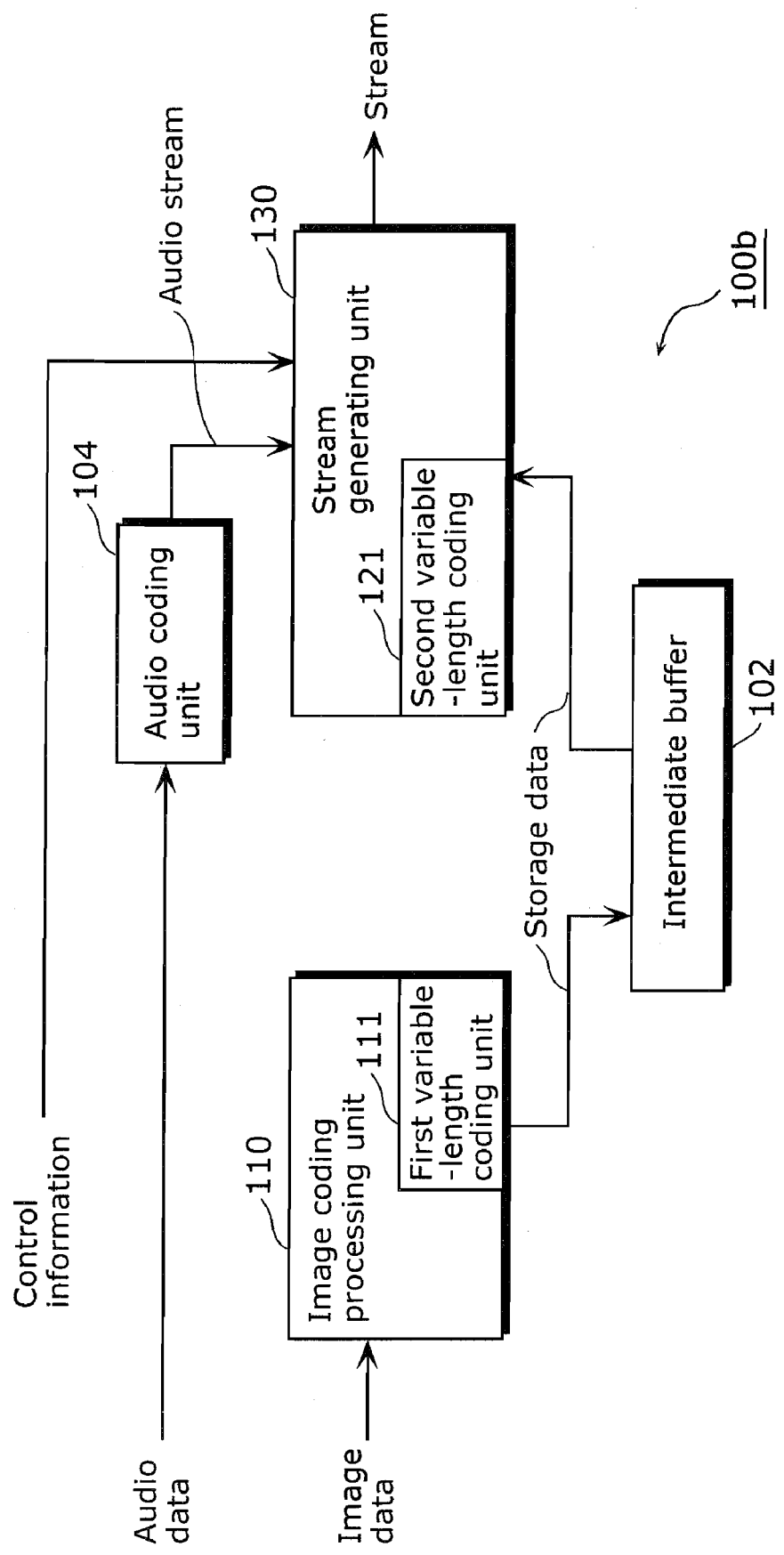
FIG. 6 is a functional block diagram which shows the functional structure of the image coding apparatus according to the same second modification.

FIG. 6 is a functional block diagram which shows the functional structure of the image coding apparatus according to the present modification.

The image coding apparatus 100b according to the present embodiment includes an image coding processing unit 110, a stream generation unit 130, an intermediate buffer 102 and an audio coding unit 104. In other words, the image coding apparatus 100b according to the present modification includes a stream generation unit 130 instead of the packet generating unit 120 in the image coding apparatus 100 of the first embodiment, and further includes an audio coding unit 104.

The audio coding unit 104 obtains audio data which indicates recorded audio and outputs the audio stream by coding the audio data.

The stream generation unit 130 includes a second variable-length coding unit 121 in the first embodiment above, and divides an image stream generated by the second variable-length coding unit 121, or the image stream read out from the intermediate buffer 102 and the audio stream generated by the audio coding unit 104 into particular sizes respectively and creates a PES by packetizing the streams divided into the particular sizes. Further, the stream generation unit 130 obtains the control information for multiplexing the audio and the image and creates a stream such as a transport stream or a program stream by multiplexing an image PES, a video PES and control information according to the control information.

Additionally, in the same way as the packet generating unit 120, the stream generation unit 130 processes the storage data, the audio stream and the control information and outputs a stream according to the output data rate determined by the user or the output data rate determined by the system which includes the image coding apparatus 100b.

Second Embodiment

Figure 7:
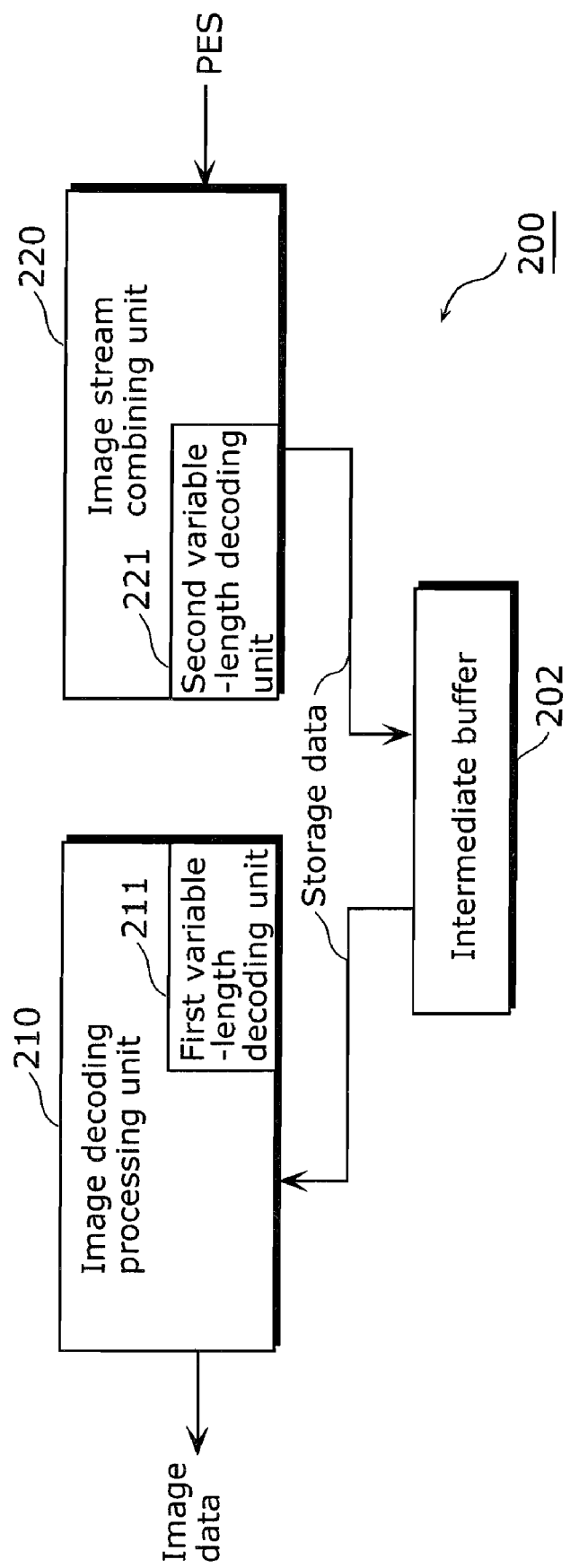
FIG. 7 is a functional block diagram which shows the functional structure of the image decoding apparatus according to the second embodiment of the present invention.

FIG. 7 is a functional block diagram which shows the functional structure of the image coding apparatus according to the second embodiment of the present invention.

The image decoding apparatus 200 in the present embodiment is an apparatus for reducing the buffer capacity to a minimum and includes an image decoding processing unit 210, an intermediate buffer 202 and an image stream combining unit 120. Additionally, the image coding apparatus 200 for example performs decoding according to the H.264/AVC standard and switches the variable-length decoding scheme between a decoding scheme corresponding to CABAC and a decoding scheme corresponding to CAVLC. Note that in the present embodiment, the image stream combining unit 220 is composed as a packet combining unit, the second variable-length decoding unit 221 is composed as a first decoding unit, and the image decoding processing unit 210 is composed as a second decoding unit.

The image stream combining unit 220 generates an image stream by obtaining the PES (input stream), extracting packets included in the PES and combining the packets. Additionally, the image stream combining unit 220 includes a second variable-length decoding unit 221. When the PES is coded by CAVLC, the second variable-length decoding unit 221 does not perform a process on the image stream and stores the image stream in the intermediate buffer 202. On the other hand, when the PES is coded by CABAC, the second variable-length decoding unit 221 generates intermediate data (decoded data) by performing arithmetic decoding, which is part of variable-length decoding, on the image stream. Subsequently, the second variable-length decoding unit 221 stores the intermediate data in the intermediate buffer 202.

Thus the image stream combining unit 220 generates an image stream or intermediate data based on the obtained PES and stores the image stream or the intermediate data as storage data in the intermediate buffer 202.

The intermediate buffer 202 temporarily holds the storage data generated by the image stream combining unit 220.

The image decoding processing unit 210 reads out the storage data stored in the intermediate buffer 202 and performs variable-length decoding (partial variable-length decoding or in whole) on the storage data and generates and outputs image data by performing image decoding post-processing, which includes reverse quantization, reverse DCT, movement compensation, intra-prediction and so on, on the storage data.

Additionally, the image coding processing unit 210 includes a first variable-length decoding unit 211. When the storage data is read out of the intermediate buffer 202 and the storage data is an image stream, in other words when the PES is coded by CAVLC, the first variable-length decoding unit 211 performs variable-length decoding corresponding to CAVLC for the image stream. As a result, the image decoding processing unit 210 performs the image decoding post-processing described above for the data which is variable-length decoded, and generates the image data.

On the other hand, when the storage data is read out of the intermediate buffer 202 and the storage data is intermediate data, in other words when the PES is coded by CABAC, the first variable-length decoding unit 211 performs partial variable-length decoding corresponding to CABAC for the intermediate data and multi-valuates the intermediate data. As a result, the image decoding processing unit 210 performs the image decoding post-processing described above for the data which is multi-valued, and generates the image data. Note that the image decoding for the PES image data is performed by performing the image decoding post-processing after the variable-length decoding described above.

When the PES is variable-length coded using CABAC, the image stream combining unit 220 in the present embodiment synchronizes the image stream generation process and the arithmetic decoding process performed by the second variable-length decoding unit 221. Subsequently, the image stream combining unit 220 performs the image stream generation process and arithmetic decoding process at the input data rate determined by the system that includes the image decoding apparatus 200. For example, the rate at which data is inputted into the image stream combining unit 220 in the Read-Only Format of a Blu-Ray Disk is defined as 40,000,000 bps for level 4.1.

Accordingly, the image stream combining unit 220 continues to input the PES at an input data rate of 40,000,000 bps, performs the image stream generation and the arithmetic decoding process and continues to output intermediate data to the intermediate buffer 202. Additionally, the image stream combining unit 220 temporarily pauses the PES input when there is no empty space in the intermediate buffer 202.

In this way, when variable-length coding is performed according to CABAC in the image coding apparatus 200 of the present embodiment, since the image stream combination unit 220 performs image stream generation and arithmetic decoding in synchronization, a buffer which stores the generated image stream can be obviated. In other words, a CPB, which is conventionally necessary, can be obviated. As a result, the buffer capacity in the entire image decoding apparatus 200 can be reduced. Further, since there is no need to include the conventionally necessary CPB, the amount of processing in the control processor for buffer control can be reduced and since the amount of LSI for the calculation process can be reduced, the data transfer rate for input and output into/from the buffer can also be reduced. As a result, the hardware amount is reduced and the LSI cost can be reduced. Additionally, since calculation processing for the buffer control can be reduced, program writing costs for the calculations can also be reduced. Additionally, even when processing in the image decoding apparatus 200 is realized using software, the buffer capacity and the processing amount can be reduced.

Figure 8:
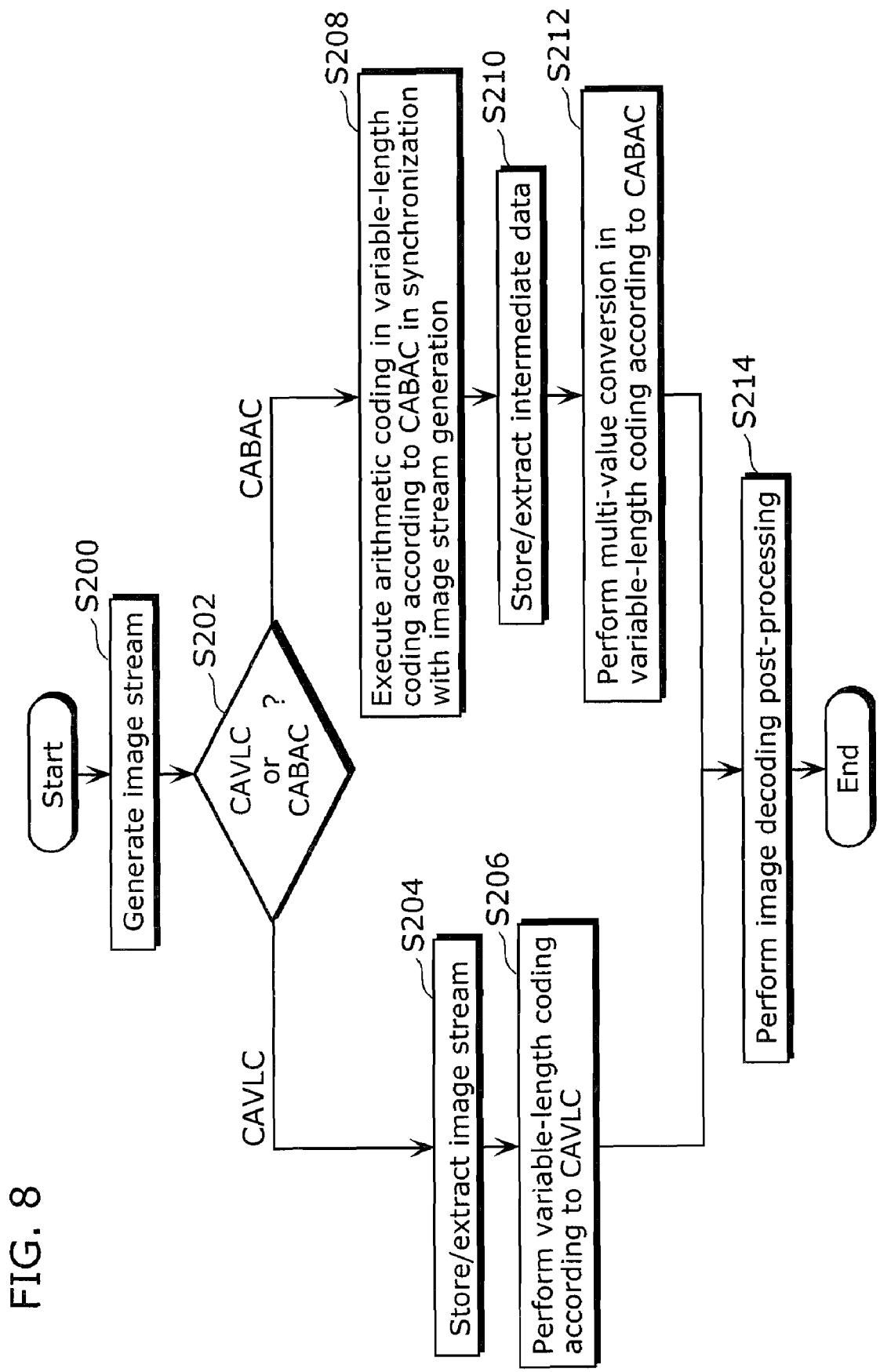
FIG. 8 is a flowchart which shows functions of the processes of the image decoding apparatus above.

FIG. 8 is a flowchart which shows functions of the image decoding apparatus 200 in the present embodiment.

First, the image decoding apparatus 200 obtains the PES and generates an image stream by combining the packets included in the PES (Step S200). Subsequently, the image decoding apparatus 200 determines whether the PES is variable-length coded by CAVLC or variable-length coded by CABAC (Step S202).

Subsequently, when the image decoding apparatus 200 determines that the PES is variable-length coded by CAVLC (CAVLC in Step S202), the image decoding apparatus 200 stores the image stream generated in Step S200 in the intermediate buffer 202 and obtains the image stream stored in the intermediate buffer 202 (Step S204). Further, the image decoding apparatus 200 executes the variable-length decoding according to CAVLC (Step S206) and executes image coding post-processing on the obtained image stream (Step S214).

On the other hand, when the image decoding apparatus 200 determines that the PES is variable-length coded using CABAC (CABAC in Step S202), the image decoding apparatus 200 executes the arithmetic decoding in the variable-length decoding according to CABAC for the image stream generated in Step S200 in synchronization with the image stream generation in Step S200 (Step S208). Subsequently, the image decoding apparatus 200 stores the intermediate data generated using the arithmetic decoding in the intermediate buffer 202 and obtains the intermediate data stored in the intermediate buffer 202 (Step S210). Further, the image decoding apparatus 200 executes multi-valuation in the variable-length decoding according to CABAC on the obtained intermediate data, and executes image coding post-processing (Step S214).

(Modification)

Below, the modification of the second embodiment above is described.

The image decoding apparatus according to the present modification decodes a coded image and audio.

Figure 9:
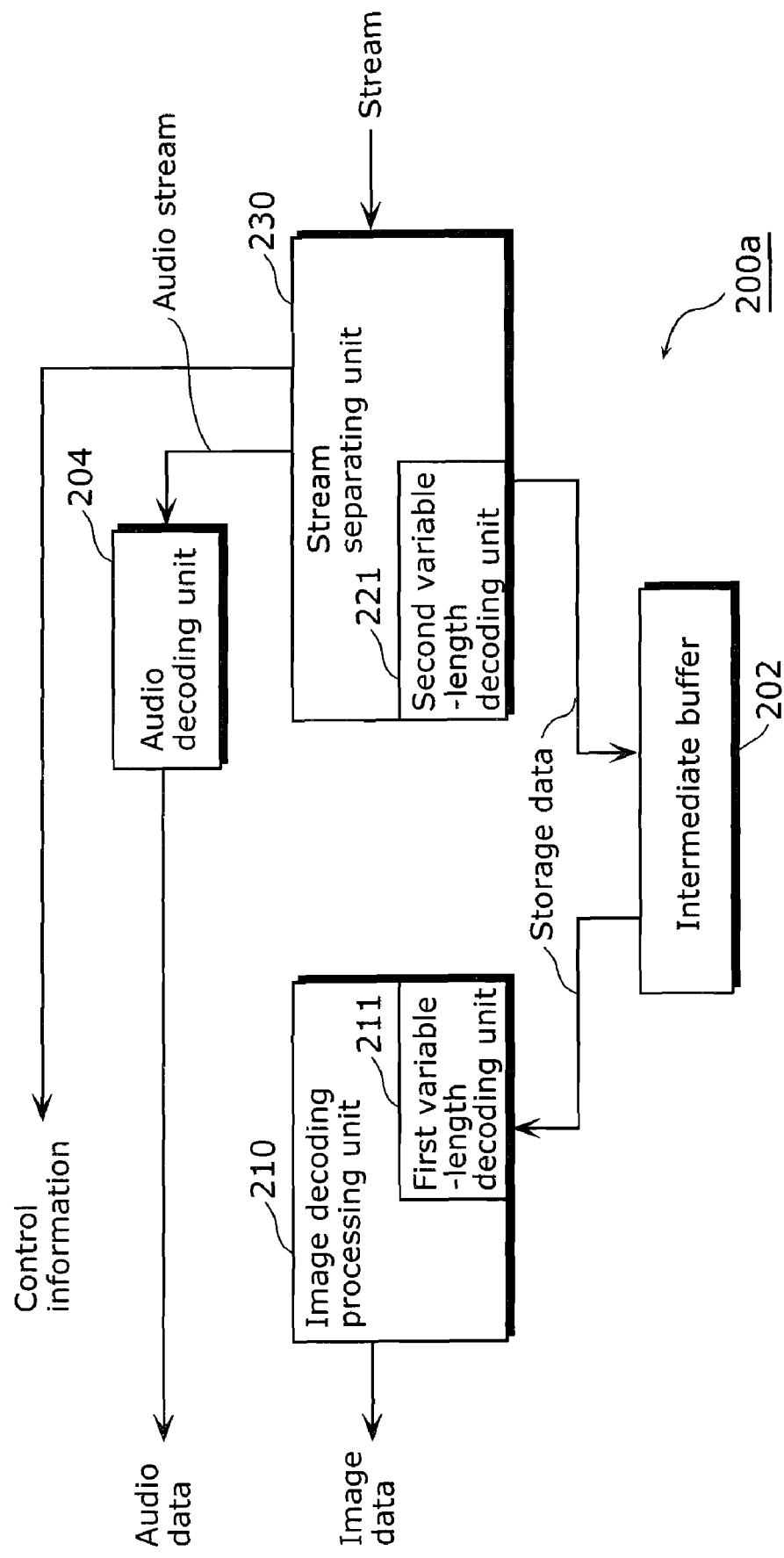
FIG. 9 is a functional block diagram which shows the functional structure of the image decoding apparatus according to the same modification above.

FIG. 9 is a functional block diagram which shows the functional structure of the image coding apparatus according to the present modification.

The image decoding apparatus 200 according to the present modification includes an image decoding processing unit 210, a stream separation unit 230, an intermediate buffer 202 and an audio decoding unit 240. In other words, the image decoding apparatus 200a according to the present modification includes a stream separation unit 230 instead of the image stream combination unit 220 in the image decoding apparatus 200 of the second embodiment above, and further includes an audio coding unit 204.

The stream separation unit 230 obtains a stream such as a transport stream or a program stream and generates an image stream, an audio stream and control information by separating the stream. The control information is information for multiplexing audio and images. In other words, the stream separation unit 230 extracts control information from the stream and separates and extracts the image PES and the audio PES from the stream according to the control information. Subsequently, the stream separation unit 230 generates an image stream by combining plural packets included in the image PES and generates an audio stream by combining plural packets included in the audio PES.

Additionally, the stream separation unit 230 includes the second variable-length decoding unit 221 in the second embodiment above. Accordingly, when the generated image stream is coded by CABAC, the second variable-length decoding unit 221 performs arithmetic decoding on the image stream.

The audio decoding unit 204 generates and outputs the audio data by decoding the audio stream generated by the stream separation unit 230.

Third Embodiment

Figure 10:
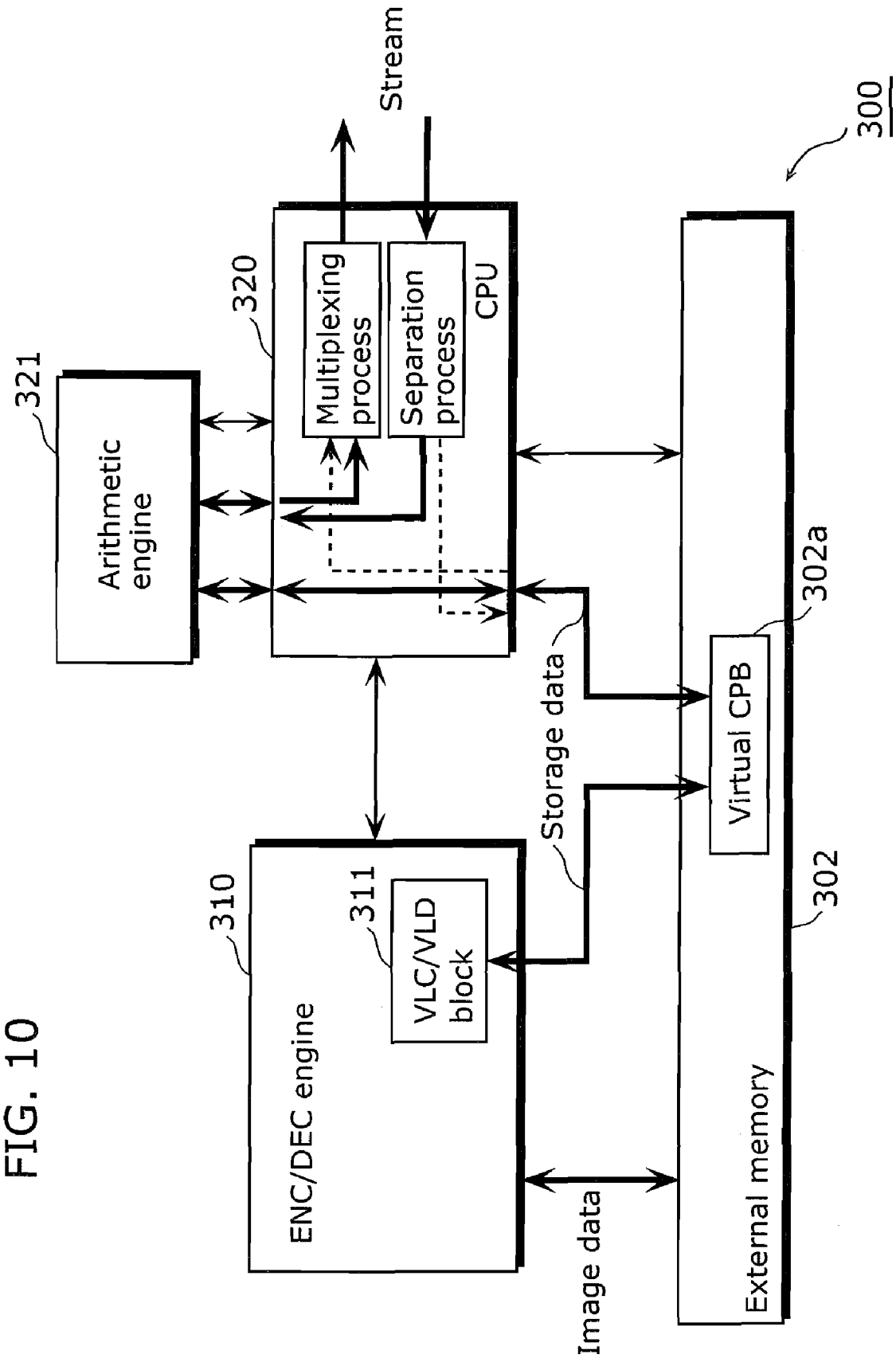
FIG. 10 is a block diagram which shows the structure of the image coding apparatus according to the third embodiment of the present invention.

FIG. 10 is a block diagram which shows the structure of the image processing apparatus according to the third embodiment of the present invention.

The image processing apparatus 300 is composed as a Large-Scale Integration (LSI) chip and includes the function of the image coding apparatus 100 in the first embodiment and the function of the image decoding apparatus 200 in the second embodiment.

The image processing apparatus 300 includes an ENC/DEC engine 310, a CPU 320, an external memory 302 and an arithmetic engine 321.

The ENC/DEC engine 310 includes the functions of the image coding processing unit 110 in the first embodiment and the functions of the image decoding processing unit 210 in the second embodiment. The ENC/DEC engine 310 includes a VLC/VLD block having the functions of the first variable-length coding unit 111 in the first embodiment and the functions of the first variable-length decoding unit 211 in the second embodiment.

In other words, the ENC/DEC engine 310 executes image coding and decoding processes as defined in AVC/H.264.

When coding, the ENC/DEC engine 310 reads out image data from the external memory 302 and executes an image coding process such as movement prediction, intra-prediction, DCT and quantization. Subsequently, when CAVLC is designated for the data generated by the image coding process, the VLC/VLD block 311 generates an image stream by executing all of the variable-length coding in CAVLC, and when CABAC is designated, the VLC/VLD block 311 generates intermediate data by executing only the binarization in the variable-length coding in CABAC. The VLC/VLD block 311 stores the generated image stream or the intermediate data as storage data in the temporary CPB 302a of the external memory 302. When CAVLC is selected for variable-length coding, the temporary CPB 302a is a CPB in the H.264/AVC standard.

When decoding, the VLC/VLD block 311 in the ENC/DEC engine 31 reads out storage data from the temporary CPB 302a in the external memory 302. Subsequently, when the storage data is an image stream, in other words when the stream inputted into the CPU 320 is coded using CAVLC, the VLC/VLD block 311 executes all of the variable-length decoding corresponding to CAVLC on the image stream which is the stored data. Subsequently, when the storage data is intermediate data, in other words when the stream inputted into the CPU 320 is coded using CABAC, the VLC/VLD block 311 executes all of the variable-length decoding corresponding to CABAC on the intermediate data which is the stored data. Subsequently the ENC/DEC engine 310 generates image data by performing image decoding post-processing such as reverse quantization, reverse DCT, movement compensation and intra-prediction on the result obtained by the VLC/VLD block 311, and stores the image data in the external memory 302.

The CPU 320 and the arithmetic engine 321 include the functions of the packet generating unit 120 in the first embodiment and the functions of the image stream combination 220 in the second embodiment.

The arithmetic engine 321 includes the functions of the second variable-length coding unit 121 in the packet generating unit 120 and the functions of the second variable-length decoding unit 221 in the image stream combination unit 220 and performs CABAC calculation coding and calculation decoding. When coding according to CABAC, the arithmetic engine 321 generates the image stream and outputs the image stream to the CPU 320 by reading out the intermediate data from the temporary CPB 302a in the external memory through the CPU 302 and by performing arithmetic coding. When decoding according to CABAC, the arithmetic engine 321 generates intermediate data by obtaining an image stream outputted from the CPU 320 and performing arithmetic decoding, and stores the intermediate data in the temporary CPB 302a in the external memory 302 through the CPU 320.

The CPU 320 performs control for the external memory 302, the ENC/DEC engine 310 and the arithmetic engine 321.

Additionally, the CPU 320 performs stream input and output control, a stream multiplexing process or a stream separation process.

In other words, when coding according to CAVLC, the CPU 320 generates and outputs a stream such as the transport stream or the program stream by packetizing and multiplexing the image stream read out from the external memory 302. Subsequently, when coding according to CABAC, the CPU 320 generates and outputs the stream above by packetizing and multiplexing the image stream outputted from the arithmetic engine 321.

On the other hand, when decoding according to CAVLC, the CPU 320 generates and outputs the image stream to the external memory 302 by obtaining a stream such as the transport stream or the program stream from outside and by dividing and combining a packet from the stream, the packet indicating an image. Subsequently, when decoding according to CAVLC, the CPU 320 generates and outputs the image stream to the calculation engine 321 by obtaining the stream above from the outside and by dividing and combining a packet from the stream, the packet indicating an image.

The external memory 302 holds the image data and temporarily holds the storage data. The storage data is held in the temporary CPB 302a.

In the image processing apparatus 300 composed in this way, image coding and decoding is performed according to control performed by the CPU 320.

More specifically, when coding is performed, the CPU 320 transfers the image data from the external memory 302 to the ENC/DEC engine 310 and instructs the ENC/DEC engine 310 to code the image data. When it is designated that variable-length coding is performed using CAVLC, the CPU 320 notifies the ENC/DEC engine 310 of a flag (entropy_coding_mode_flag=0) which indicates that variable-length coding is performed using CAVLC and instructs the ENC/DEC engine 310 to code the image data. When it is designated that variable-length coding is performed using CABAC, the CPU 320 notifies the ENC/DEC engine 310 of a flag (entropy_coding_mode_flag=1) which indicates that variable-length coding is performed using CABAC and instructs the ENC/DEC engine 310 to code the image data.

The ENC/DEC engine 310 which has received the coding instruction generates storage data by coding the image data according to the flag which is notified and stores the storage data in the temporary CPB 302a in the external memory 302.

Next, the CPU 320 generates a stream according to the output data rate designated by the user or to the output data rate designated by the system which includes the image processing apparatus 300. The CPU 320 reads out an amount of the storage data that is process able in the CPU 320 from the external memory 302 and when coding according to CABAC, instructs the arithmetic engine 321 to arithmetically code the storage data (intermediate data). The arithmetic engine 321 designated to perform arithmetic coding executes the calculation coding on the inputted intermediate data and outputs the image stream. The CPU 320 which has received the image stream generates and outputs a stream by performing the multiplexing process on the image stream.

Additionally, the CPU 320 compares the output data rate designated by the user or the output data rate designated by the system described above and the data rate of the stream outputted by the CPU 320. Subsequently, when the outputted stream rate is larger, the CPU 320 pauses the input from the external memory 302 of the storage data and when the outputted stream rate is smaller, the CPU 320 increases the input amount of the storage data from the external memory 302 and matches the data rate for the outputted stream to the output data rate of the designated target.

For example, when an output data rate of 16 Mbps is designated (set), and when data which is more than 1.6 Mbit in 1/10 second is outputted from the CPU 320, the CPU 320 slightly reduces to a minimum input of the storage data from the external memory 302. On the other hand, when data less than 1.6 Mbit is outputted from the CPU 320, the CPU 320 increases the input of storage data from the external memory 302. Further, when the coding is designated to be performed by CABAC, the CPU 320 increases the processing amount of the packetization and the arithmetic coding processing amount. The CPU 320 controls the output code amount per second to 16 Mbit by the function above.

On the other hand, the CPU 320 inputs a stream at a rate designated by the user or at a rate designated by the system which includes the image processing apparatus 300. The CPU 320 performs separation processing on the inputted stream and extracts the image stream. When the stream is coded by CABAC, the image stream is immediately inputted into the arithmetic engine 321 and the CPU 320 instructs the arithmetic engine 321 to perform the arithmetic decoding processing. The arithmetic engine 321 generates and outputs the intermediate data by performing arithmetic decoding processing according to the instruction of the CPU 320. The intermediate data is stored in the temporary CPB 302a in the external memory 302. When the intermediate data is stored in the external memory 302, the CPU 320 transfers the intermediate data to the ENC/DEC engine 310 and instructs the ENC/DEC engine 310 to decode the intermediate data. The ENC/DEC engine 310 which has received the decoding instruction generates image data by decoding the intermediate data and stores the intermediate data in the external memory 302.

Figure 11:
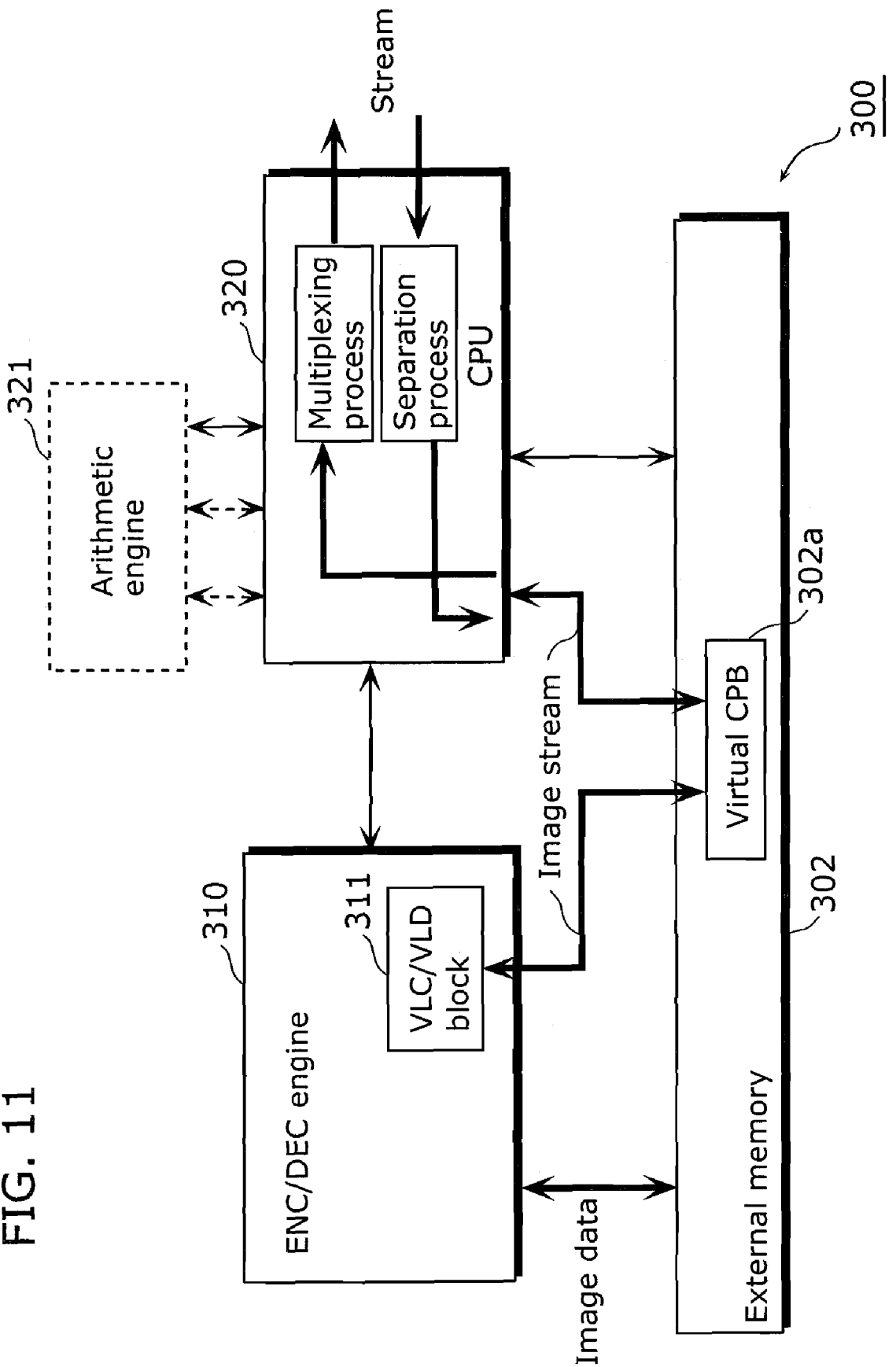
FIG. 11 is an illustrative diagram for explaining the state of the image processing apparatus which performs processing according to the CAVLC above.

FIG. 11 is a descriptive diagram for describing the situation of the image processing apparatus 300 which performs processing according to CAVLC.

As described above, when variable-length coding according to CAVLC or variable-length decoding corresponding to the coding is performed, and when the flag (entropy_coding_mode_flag) is 0, the calculation engine 321 stops all of the processing as shown in FIG. 11. Accordingly, when coding according to CAVLC, the CPU 320 reads out the image stream from the external memory 302 and performs a multiplexing process on the image stream, and when decoding according to CAVLC, the image stream generated by the separation process is stored in the external memory 302. Accordingly, when coding according to CAVLC, the image stream read out from the CPU 320 is not passed to the arithmetic engine 321 and instead multiplex processing is performed immediately on the image stream. Additionally, when decoding according to CAVLC, the image stream for which the separation process has been performed is not passed to the arithmetic engine 321 and instead is immediately stored in the temporary CPB 302a in the external memory 302.

Above, the image coding apparatus and the image decoding apparatus according to the present invention have been described using the first through third embodiments and their modifications, however the present invention is not limited to these embodiments.

For example, in the first through third embodiments and their modifications, coding or decoding are performed by switching between CAVLC and CABAC, however coding or decoding alone may be performed using CABAC.

Additionally, in the first and second embodiment and their modifications, since the capacities of the intermediate buffer 102 and 202 are larger than the capacity of the Coded Picture Buffer (CPB) determined in the H.264/AVC standard, a capacity according to the format of the intermediate data may be set. For example, the capacity of the intermediate buffer 102 and 202 is set to 1.6 times the capacity of the above-described CPB. Additionally, when the intermediate data is compressed, the capacity of the intermediate buffer 102 and 202 is set to 1.5 times the capacity of the above-described CPB. Thus, the capacities of the intermediate buffers 102 and 202 can be set to appropriate capacities.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The image coding apparatus and the image decoding apparatus in the present invention have the effect that the buffer capacity can be reduced to a minimum, and can for example be applied to for example an image coding apparatus or an image decoding apparatus which perform H.264/AVC arithmetic coding such as a cellular phone, a video camera or a PC.

What is claimed is:
1. An image coding apparatus which performs coding on image data representing a moving image, said image coding apparatus comprising:
    a first coding unit configured to generate first data by executing, on the image data, processing in and before a binarization process performed during the coding of the image data;
    a buffer unit configured to temporarily store the generated first data;
    a second coding unit configured to generate second data by reading out the first data stored in said buffer unit and executing an arithmetic coding process on the read-out first data; and a packetizing unit configured to, subsequent to the arithmetic coding process, packetize and output the second data without temporarily recording the generated second data, wherein said second coding unit is configured to change an amount of the second data to be output to said packetizing unit by changing an amount of the first data to be read out from said buffer unit and an amount of processing on the read-out first data so that a difference between a preset target value and an amount of data which said packetizing unit actually outputs is reduced.

2. The image coding apparatus according to claim 1, wherein said second coding unit is configured to increase the amount of the first data to be read out from said buffer unit and increase the amount of processing on the read-out first data, when the amount of data which said packetizing unit outputs is smaller than the preset target value.

3. The image coding apparatus according to claim 2, wherein an amount of data which said second coding unit reads out from said buffer unit per unit time and an amount of data which said packetizing unit outputs per unit time are substantially the same.

* * * * *